(12) United States Patent
Allton et al.

(10) Patent No.: US 9,133,597 B2
(45) Date of Patent: Sep. 15, 2015

(54) FOUNDATION STRUCTURE

(75) Inventors: Richard Allton, Leicester (GB); Philippe Gilson, Voreppe (FR)

(73) Assignee: ALSTOM RENEWABLE TECHNOLOGIES, Grenoble (FR)

( * ) Notice: Subject to any disclaimer, the term of this patent is extended or adjusted under 35 U.S.C. 154(b) by 0 days.

(21) Appl. No.: 13/516,361

(22) PCT Filed: Dec. 17, 2010

(86) PCT No.: PCT/GB2010/002291
§ 371 (c)(1),
(2), (4) Date: Nov. 27, 2012

(87) PCT Pub. No.: WO2011/073627
PCT Pub. Date: Jun. 23, 2011

(65) Prior Publication Data
US 2013/0064608 A1 Mar. 14, 2013

(30) Foreign Application Priority Data

Dec. 18, 2009 (GB) .................................... 0922075.7

(51) Int. Cl.
*B63B 35/40* (2006.01)
*E02D 23/12* (2006.01)
*E02B 9/08* (2006.01)
(Continued)

(52) U.S. Cl.
CPC . *E02D 23/12* (2013.01); *E02B 9/08* (2013.01); *E02D 23/02* (2013.01); *E02D 27/52* (2013.01); *Y02E 10/28* (2013.01)

(58) Field of Classification Search
CPC .......... E02B 17/00; E02D 27/52; E02D 29/06

USPC ................... 405/195, 196, 201; 114/124, 317
See application file for complete search history.

(56) References Cited

U.S. PATENT DOCUMENTS 2,921,442 A * 1/1960 Laborde et al. ............... 405/207
3,327,668 A * 6/1967 Von Schultz ................. 114/265
(Continued)

FOREIGN PATENT DOCUMENTS

DE 197 44 174 A1 4/1999
EP 0 580 513 A1 1/1994
(Continued)

OTHER PUBLICATIONS

International Search Report and Written Opinion dated Jun. 7, 2011 of PCT/GB2010/002291—16 pages.
(Continued)

*Primary Examiner* — Thomas B Will
*Assistant Examiner* — Katherine Chu
(74) *Attorney, Agent, or Firm* — Buchanan Ingersoll & Rooney PC

(57) ABSTRACT

A foundation structure for locating an object mounted on the foundation structure on a sea bed or a river bed comprises an integral buoyancy device having variable buoyancy and a rigid control surface. The integral buoyancy device is movable relative to the foundation structure to vary the position of the rigid control surface and to control the position of the center of buoyancy relative to the position of the center of gravity. This stabilizes the foundation structure during submergence and surfacing. A method for controlling the deployment and retrieval of the foundation structure is also described.

31 Claims, 16 Drawing Sheets

(51) Int. Cl.
*E02D 23/02* (2006.01)
*E02D 27/52* (2006.01)

(56) References Cited

U.S. PATENT DOCUMENTS

| | | | |
|---|---|---|---|
| 3,643,446 | A | 2/1972 | Mott |
| 4,000,624 | A * | 1/1977 | Chow .............................. 405/204 |
| 4,087,984 | A * | 5/1978 | Mo ................................ 405/207 |
| 4,222,682 | A * | 9/1980 | Vilain ........................... 405/203 |
| 5,529,007 | A * | 6/1996 | Fitzpatrick ................ 114/39.21 |
| 5,609,442 | A * | 3/1997 | Horton .......................... 405/205 |
| 6,196,767 | B1 | 3/2001 | Thomas |
| 6,869,251 | B2 * | 3/2005 | Zou et al. ...................... 405/205 |
| 7,726,911 | B1 * | 6/2010 | Dempster .................... 405/210 |
| 2007/0140794 | A1 * | 6/2007 | Natvig ......................... 405/204 |
| 2010/0183377 | A1 * | 7/2010 | Fraenkel ....................... 405/232 |

FOREIGN PATENT DOCUMENTS

| | | |
|---|---|---|
| EP | 0 942 102 A1 | 9/1999 |
| EP | 2 036 813 A1 | 3/2009 |
| FR | 2 244 357 A5 | 4/1975 |
| GB | 782 858 A | 9/1957 |
| GB | 1 266 247 | 3/1972 |
| GB | 1 574 313 | 9/1980 |
| GB | 2 431 207 A | 4/2007 |
| JP | 10096241 A | 4/1998 |
| RU | 2057845 C1 | 4/1996 |
| SU | 1064874 A | 12/1983 |
| SU | 1721179 A1 | 3/1992 |
| WO | 03/004869 A1 | 1/2003 |
| WO | 2008/006145 A1 | 1/2008 |

OTHER PUBLICATIONS

Office Action (Decision on Grant) issued on Mar. 3, 2015, by the Russian Patent Office in corresponding Russian Patent Application No. 2012130424/03, and an English Translation of the Office Action. (15 pages).

Examination Report issued Jan. 21, 2015 by the UK Patent Office in corresponding GB Application No. 0922075.7.

* cited by examiner

FOUNDATION STRUCTURE

CROSS REFERENCE TO RELATED APPLICATIONS

This application is the U.S. National Phase of International Application No. PCT/GB2010/002291, filed Dec. 17, 2010, designating the U.S. and published as WO 2011/073627 on Jun. 23, 2011 which claims the benefit of British Patent Application No. 0922075.7 filed Dec. 18, 2009.

FIELD OF THE INVENTION

The present invention relates to a foundation structure, and more particularly to a foundation structure for locating an object such as a tidal turbine on a sea bed or river bed. Embodiments of the present invention also relate to a method for controlling the deployment and retrieval of a foundation structure so that an object, such as a tidal turbine, mounted on the foundation structure can be located on, or retrieved from, a sea bed or river bed.

BACKGROUND TO THE INVENTION

Foundation structures are commonly used to locate objects on sea beds and river beds, and are particularly suited to the installation of tidal turbines. One common type of foundation structure is a gravity base structure. A gravity base structure is normally towed to the location at which installation of an object on a sea bed or river bed is desired and includes ballast tanks which can be filled or emptied with suitable ballast material to control the buoyancy of the gravity base structure. The gravity base structure can be lowered in the water, towards the sea bed or river bed, for example by flooding the ballast tanks with water and can be raised from the sea bed or river bed by evacuating water from the ballast tanks if it becomes necessary to retrieve the object mounted on the gravity base structure from the sea bed or river bed.

It is important to be able to control the stability of a foundation structure such as a gravity base structure during the submergence (deployment) and surfacing (retrieval) operations and this requires careful control of the position of the centre of buoyancy of the structure relative to the position of the centre of gravity of the structure. Gravity base structures with permanent structural features that contribute to such stability have been proposed. However, these permanent structural features can affect the stability and/or performance of the gravity base structure when it is located in its final position on a sea bed or river bed, in particular due to increased drag. For example, permanent structural features in the form of vertical extensions have been used to control the stability of a gravity base structure during submergence of the structure, but those permanent vertical extensions render the gravity base structure unsuitable for use in locations where there are strong tidal currents.

There is a need for a foundation structure which has improved stability during submergence and surfacing and which has acceptable stability and performance when located on a sea bed or river bed.

SUMMARY OF THE INVENTION

According to a first aspect of the present invention, there is provided a foundation structure for locating an object mounted on the foundation structure on a sea bed or a river bed, the foundation structure comprising an integral buoyancy device having variable buoyancy and a rigid control surface, the integral buoyancy device being movable relative to the foundation structure to vary the position of the rigid control surface and control the position of the centre of buoyancy relative to the position of the centre of gravity.

According to a second aspect of the present invention, there is provided a method for controlling the deployment and retrieval of a foundation structure having an object mounted thereon for location on a sea bed or river bed, the foundation structure comprising an integral movable buoyancy device having variable buoyancy and a rigid control surface, the method comprising varying the position of the integral movable buoyancy device relative to the foundation structure to vary the position of the rigid control surface and control the position of the centre of buoyancy relative to the position of the centre of gravity.

For the foundation structure to be metastable whilst floating so that it has optimum stability, the centre of buoyancy needs to be positioned below the centre of gravity whilst for the foundation structure to be stable whilst submerged, the centre of buoyancy needs to be positioned above the centre of gravity. The ability to vary the position of the integral buoyancy device, and hence the position of the rigid control surface, relative to the foundation structure improves the stability of the foundation structure during submergence and surfacing by allowing the position of the centre of buoyancy to be controlled relative to the position of the centre of gravity whilst preserving a waterplane. More particularly, the ability to vary the position of the integral buoyancy device, and hence the position of the rigid control surface, relative to the foundation structure allows the waterplane of the foundation structure to be preserved until the centre of buoyancy has moved by a sufficient amount from a position below the centre of gravity (for optimum surfaced stability) to a position above the centre of gravity (for submerged stability), or vice-versa. Adequate stability of the foundation structure can, thus, be maintained during the transition between the metastable surfaced and stable submerged conditions, enabling the foundation structure to be submerged and surfaced in a controlled manner. Moreover, when the foundation structure is located on a sea bed or river bed, the integral buoyancy device, and hence the rigid control surface, can be moved to a retracted position in which the foundation structure is as stable as possible. In particular, unwanted extensions or protrusions that might otherwise increase the drag force on the foundation structure can be eliminated.

The foundation structure may be held in place on the sea bed or river bed by frictional forces between the foundation structure and the sea bed or river bed. The foundation structure may alternatively or additionally be held in place on the sea bed or river bed by securing the foundation structure to the sea bed or river bed. For example, the foundation structure could include a projection which can be embedded into the sea bed or river bed to positively secure the foundation structure to the sea bed or river bed. The foundation structure could be a gravity base structure which is held in place on the sea bed or river bed solely by frictional forces between the gravity base structure and the sea bed or river bed.

The integral movable buoyancy device typically comprises a plurality of rigid surfaces enclosing a buoyant volume. The buoyant volume is, therefore, fixed which means that the shape of the integral movable buoyancy device does not vary. The movement of the rigid control surface relative to the foundation structure is effected solely by moving the integral movable buoyancy device relative to the foundation structure.

One or more of the rigid surfaces may act as the rigid control surface. The integral movable buoyancy device may comprise a plurality of rigid control surfaces, each provided by one of the rigid surfaces enclosing the buoyant volume.

The foundation structure typically includes one or more further integral buoyancy devices. The or each further integral buoyancy device may have individually variable buoyancy. An increased number of integral buoyancy devices permits greater control of the gross buoyancy, and hence overall stability, of the foundation structure during submergence and surfacing. The or each further integral buoyancy device may comprise a plurality of rigid surfaces enclosing a buoyant volume, as described above.

The foundation structure may include at least one pair of said integral movable buoyancy devices which may be arranged symmetrically on the foundation structure. The integral movable buoyancy devices may be arranged symmetrically about a centreline of the foundation structure. The provision of at least one pair of symmetrically arranged integral movable buoyancy devices enables the foundation structure to be maintained in a substantially horizontal attitude during the submergence operation.

One or more of the further integral buoyancy devices may be integral static buoyancy devices.

One or more of the further integral buoyancy devices may each include a rigid control surface and may be movable relative to the foundation structure to vary the position of the rigid control surface relative to the foundation structure. When the foundation structure includes a plurality of integral movable buoyancy devices whose movement relative to the foundation structure can be individually controlled, greater control of the stability of the foundation structure may be possible during submergence and surfacing by allowing the position of the centre of buoyancy to be more carefully controlled whilst preserving a waterplane.

The or each integral movable buoyancy device may be movable between a retracted position and an extended position. When in the extended position, the or each integral movable buoyancy device, and the or each associated rigid control surface, extends outwardly away from the foundation structure. This enables the waterplane of the foundation structure to be preserved until the centre of buoyancy of the foundation structure has moved from a position below the centre of gravity (for optimum surfaced stability) to a position above the centre of gravity (for submerged stability). When in the retracted position, the or each integral movable buoyancy device is substantially aligned with adjacent surfaces of the foundation structure and does not project therefrom. When the foundation structure is located on a sea bed or river bed, drag forces acting on the foundation structure can thus be minimised by moving the or each integral movable buoyancy device to its retracted position. This enables the foundation structure to be used in locations where there may be strong currents and where conventional foundation structures including permanent structural extensions that contribute to stability during submergence and surfacing are not ideally suited.

The movement of the or each integral movable buoyancy device relative to the foundation structure may be controlled by varying the gross buoyancy of the foundation structure.

The gross buoyancy of the foundation structure may be controlled by varying the buoyancy of the or each integral movable buoyancy device. The movement of the or each integral movable buoyancy device relative to the foundation structure may thus be controlled by varying the buoyancy of one or more of said integral movable buoyancy devices.

The gross buoyancy of the foundation structure may be controlled by varying the buoyancy of the or each integral static buoyancy device. The movement of the or each integral movable buoyancy device relative to the foundation structure may thus be controlled by varying the buoyancy of one or more of said integral static buoyancy devices.

The foundation structure may include retaining means which are selectively operable to retain the or each integral movable buoyancy device in its retracted position. The retaining means could, for example, comprise an acoustic release.

The foundation structure may include a restraint to limit the movement of the integral movable buoyancy device. When the foundation structure comprises a plurality of said integral movable buoyancy devices, the foundation structure may include a plurality of said restraints and each restraint may limit the movement of one of said integral movable buoyancy devices relative to the foundation structure. Alternatively, a single restraint could limit the movement of a plurality of said integral movable buoyancy devices. For example, if the distance between certain points on two integral movable buoyancy devices increases as the integral movable buoyancy devices are moved from the retracted position to the extended position, the restraint could be used to limit the maximum permitted distance and thereby limit the movement of both of the integral buoyancy devices. The or each restraint may be a tether.

The movement of one integral movable buoyancy device could be at least partially controlled by controlling the movement of another of the integral movable buoyancy devices. For example, two of said integral movable buoyancy devices could cooperate with each other when in the retracted position, and the cooperation could prevent the movement of one of the integral movable buoyancy devices from the retracted position to the extended position. The movement of one of the integral movable buoyancy devices from the retracted position to the extended position could remove that cooperation and effectively unlatch the other integral movable buoyancy device, thereby allowing it to move freely from the retracted position to the extended position.

The foundation structure could include one or more actuators to control the movement of the or each integral movable buoyancy device relative to the foundation structure. It may, however, be preferable to control the movement of the or each integral movable buoyancy device by varying the gross buoyancy of the foundation structure as aforesaid, to simplify the construction of the foundation structure and the deployment and retrieval operations.

The or each integral movable buoyancy device may be mounted on the foundation structure for rotation and/or translation relative to the foundation structure so that the or each integral movable buoyancy device can move between the aforementioned retracted and extended positions. The or each integral movable buoyancy device may be mounted in any suitable manner to permit movement between the retracted and extended positions. For example, the or each integral movable buoyancy device could be pivotally mounted on the foundation structure for rotation relative to the foundation structure.

In typical embodiments, the or each integral buoyancy device, whether static or movable, comprises a buoyancy tank. The buoyancy tank is preferably generally rigid and has a fixed volume.

In some embodiments, the or each integral movable buoyancy device may comprise at least two buoyancy tanks, or possibly at least two groups of buoyancy tanks, whose buoyancy may be individually varied to control the movement of the integral movable buoyancy device relative to the foundation structure, and more particularly relative to a static part of the foundation structure. Such an arrangement may obviate the need to provide integral static buoyancy devices and may enable the submergence operation to be controlled solely by individually varying the buoyancy of the buoyancy tanks.

One embodiment of the aforesaid method for controlling the deployment and retrieval of the foundation structure comprises varying the gross buoyancy of the foundation structure to vary the position of the integral movable buoyancy device relative to the foundation structure.

The method may comprise varying the buoyancy of the integral movable buoyancy device to vary its position, and hence the position of its rigid control surface, relative to the foundation structure.

In embodiments in which the integral movable buoyancy device comprises at least two buoyancy tanks or at least two groups of buoyancy tanks, the method may comprise individually varying the buoyancy of the buoyancy tanks to control the movement of the integral movable buoyancy device.

When the foundation structure comprises a plurality of said further integral buoyancy devices each having variable buoyancy, the method may comprise varying the buoyancy of one or more of said further integral buoyancy devices to vary the gross buoyancy of the foundation structure and hence to vary the position of the integral movable buoyancy device relative to the foundation structure.

One or more of the further integral buoyancy devices are typically integral static buoyancy devices. The method may thus comprise varying the buoyancy of one or more of the integral static buoyancy devices to vary the position of the integral movable buoyancy device relative to the foundation structure. It will be appreciated that varying the buoyancy of one or more of the integral static buoyancy devices provides the aforesaid variation of the gross buoyancy of the foundation structure.

Alternatively or in addition, one or more of the further integral buoyancy devices may be integral movable buoyancy devices having variable buoyancy and a rigid control surface. The method may thus comprise varying the position of one or more of the integral movable buoyancy devices relative to the foundation structure to vary the position of the or each rigid control surface and, hence, to stabilise the foundation structure during submergence and surfacing.

The method typically comprises moving the or each integral movable buoyancy device to an extended position during submergence and surfacing of the foundation structure. This stabilises the foundation structure, in particular in pitch and roll, when partially floating and partially submerged by maintaining a waterplane. The extended position of the or each integral movable buoyancy device may be defined by limiting the movement of the or each integral movable buoyancy device, typically by way of a restraint as described above.

The method typically also comprises moving the or each integral movable buoyancy device to a retracted position when the foundation structure is located on a sea bed or river bed. As discussed above, this minimises the drag forces exerted on the foundation structure. The or each integral movable buoyancy device is also typically moved to the retracted position when the foundation structure is fully surfaced and floating on the surface of the water. Again, this enables the stability of the foundation structure to be optimised by ensuring that the centre of buoyancy of the foundation structure is positioned below the centre of gravity of the foundation structure.

When the or each integral buoyancy device comprises a buoyancy tank, the method normally comprises varying the buoyancy of the or each buoyancy tank, whether it is static or movable, by varying the quantity of fluid inside the or each buoyancy tank. For example, water may be introduced into, or evacuated from, the or each integral buoyancy tank to vary its buoyancy.

The foundation structure may be used to mount any suitable object on a sea bed or river bed. For example, the object could be an energy capture device such as a tidal turbine, either ducted or unducted, or an oscillating hydrofoil. Other examples of suitable objects include, but are not limited to, a transformer and a sea bed electrical connection hub.

DETAILED DESCRIPTION OF EMBODIMENTS OF THE INVENTION

Embodiments of the present invention will now be described by way of example only and with reference to the accompanying drawings.

Figure 1:
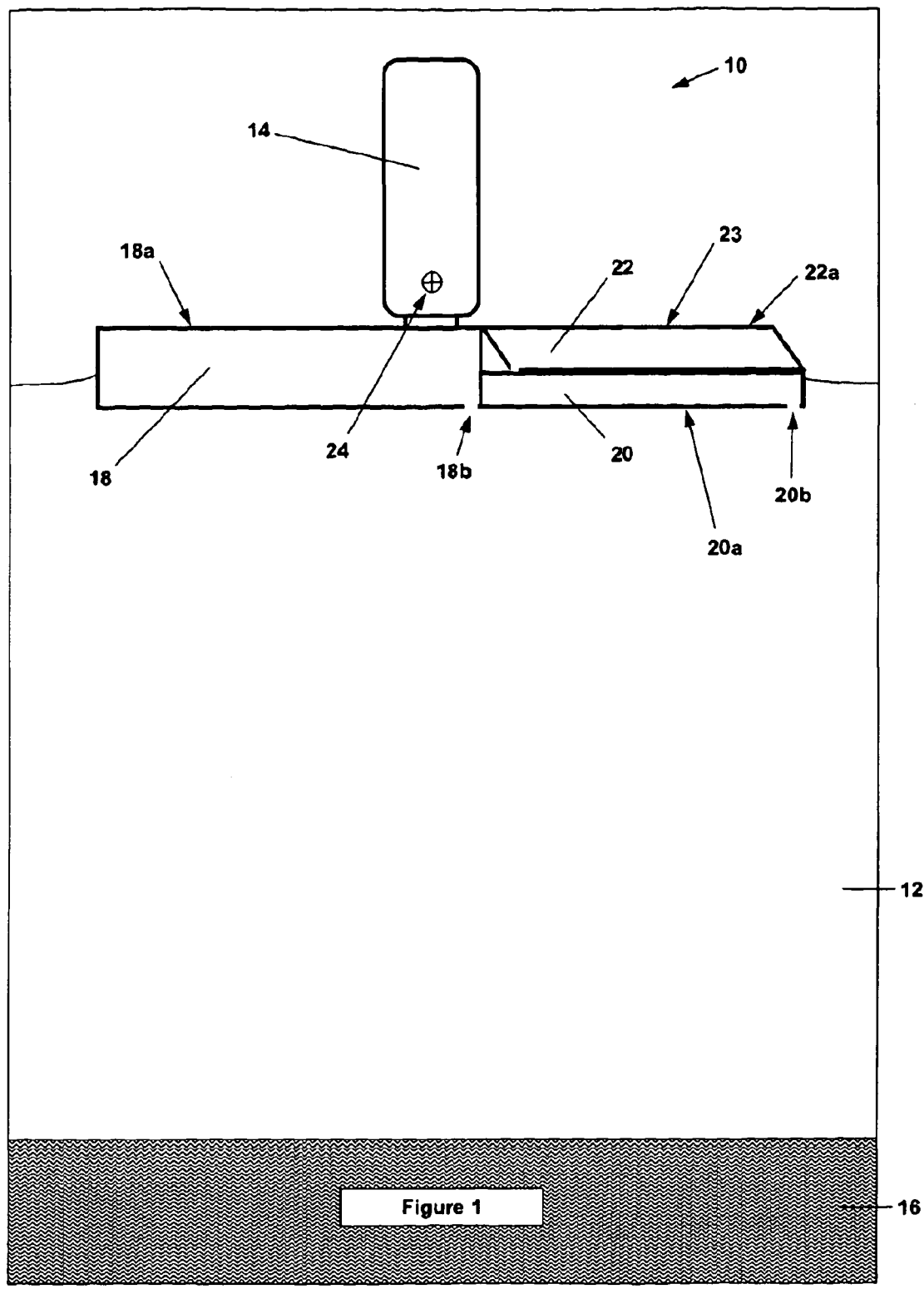
FIG. 1 is a schematic side elevation of a foundation structure according to one embodiment of the invention in a fully surfaced condition, floating on the surface of a body of water.

Referring initially to FIG. 1, there is shown a foundation structure in the form of a gravity base structure 10 in a fully surfaced condition floating on the surface of a body of water 12, such as a sea or river. The gravity base structure 10 is typically formed of steel and/or concrete and carries an object 14 that needs to be located on a sea bed or river bed 16. In the illustrated embodiment, the object 14 is a tidal turbine mounted on the gravity base structure 10, but it will be understood that any object that needs to be located on the sea bed or river bed 16 may be mounted on the gravity base structure 10.

The gravity base structure 10 comprises a plurality of integral buoyancy devices in the form of integral ballast tanks 18, 20, 22. The first and second integral ballast tanks 18, 20 are static and the third integral ballast tank 22 is movable relative to the first and second ballast tanks 20, 22 and, hence, relative to the gravity base structure 10. More particularly, the third ballast tank 22 is pivotally mounted on the first ballast tank 18 so that it can rotate relative to the first ballast tank 18 and, hence, relative to the gravity base structure 10. The pivotal mounting 21 (FIGS. 3 and 10) may be provided by any suitable means. Flexible elements 32 (FIG. 10), for example formed of rope, may be particularly suitable as they do not suffer from fouling or lack of lubrication.

In the illustrated embodiment, the third ballast tank 22 is located above the second ballast tank 20, and the combined depth of the second and third ballast tanks 20, 22 is roughly the same as the depth of the first ballast tank 18. The first ballast tank 18 is located at the bow of the gravity base structure 10 whilst the second and third ballast tanks 20, 22 are located at the stern. Although not apparent from the Figures, the gravity base structure 10 is of a catamaran configuration with the illustrated arrangement of ballast tanks 18, 20, 22 being mirrored on both sides of the gravity base structure 10. This configuration is not, however, essential to the invention and many other configurations can be adopted.

Both the first and second (static) ballast tanks 18, 20 and the third (movable) ballast tank 22 include rigid surfaces 18a, 20a, 22a which define a buoyant volume for each ballast tank 18, 20, 22. The buoyant volume is fixed by the rigid surfaces 18a, 20a, 22a and hence the shape of the ballast tanks 18, 20, 22 does not vary as they are filled with ballast material. One or more of the rigid surfaces 22a of the movable ballast tank 22 act as a rigid control surface 23 which assists with controlling the stability of the gravity base structure 10 during submergence and surfacing, as will be described later in the specification.

Figure 10:
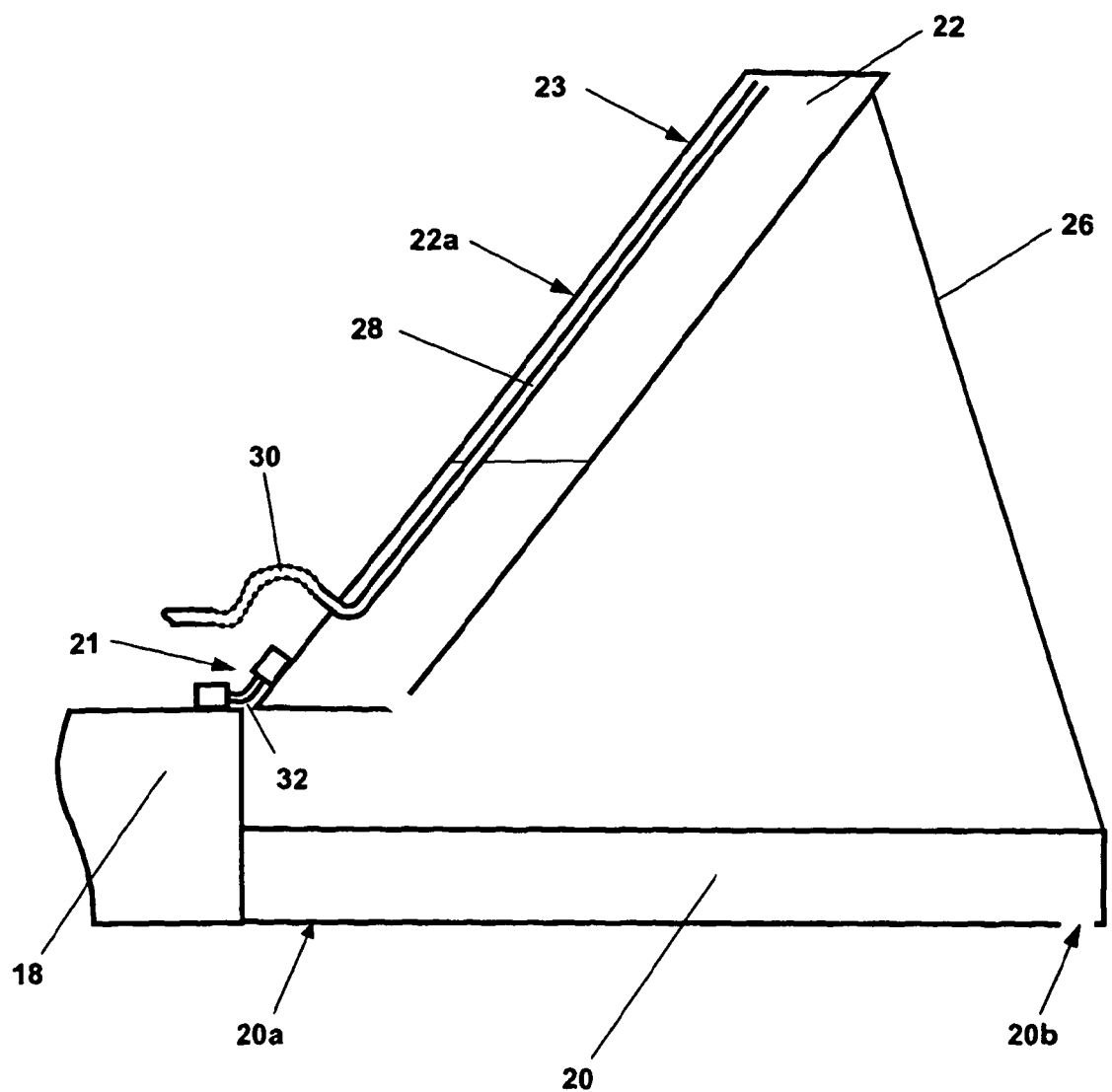
FIG. 10 is an enlarged schematic side elevation of part of the foundation structure of FIGS. 1 to 9.

Each of the ballast tanks 18, 20, 22 includes a limber hole 18b, 20b, 22b to enable water to be admitted into the ballast tanks 18, 20, 22 when the pressure inside the ballast tanks 18, 20, 22 is less than the hydrostatic pressure at the limber holes 18b, 20b, 22b of the respective ballast tanks. Referring to FIG. 10 which illustrates the third ballast tank 22 in greater detail, each of the ballast tanks 18, 20, 22 typically also includes a rigid pipe 28, the primary purpose of which is to enable air or any other suitable gas to be removed from the respective ballast tank as water is admitted via the respective limber hole. The buoyancy of each individual ballast tank 18, 20, 22, and hence the gross buoyancy of the complete gravity base structure 10, can thus be varied by varying the amount of water, which acts as a ballast material, inside each ballast tank 18, 20, 22.

A flexible pipe connection 30 provides a connection between the rigid pipe 28 inside each ballast tank 18, 20, 22 and a pipe leading to the surface of the body of water 12. A suitable detachable connection is normally used to enable air or another suitable gas to be transferred between the surface and the ballast tanks 18, 20, 22 via the rigid and flexible pipes.

In the condition illustrated in FIG. 1, the ballast tanks 18, 20, 22 contain only a suitable gas, such as air, and do not contain any water. In this condition, the centre of buoyancy of the gravity base structure 10 is positioned below the centre of gravity 24 of the gravity base structure 10. The gravity base structure 10 is, thus, metastable and can be floated out, with the first and second ballast tanks 18, 20 partially submerged, to a position where it is intended to locate the tidal turbine or other object 14 on the sea bed or river bed. It will be noted that in the fully surfaced condition illustrated in FIG. 1, the third ballast tank 22 is in a retracted position in which it lies on top of the second ballast tank 20 and does not extend outwardly away from the remainder of the gravity base structure 10. The third ballast tank 22 may be secured in this retracted position whilst the gravity base structure 10 is in the fully surfaced condition, for example using suitable retaining means such as an acoustic release.

As is conventional in the art, water is introduced into the ballast tanks 18, 20, 22 to flood them and to make the complete gravity base structure 10 negatively buoyant so that it sinks towards the sea bed or river bed 16. As discussed above, in order for the gravity base structure 10 to be stable when in the submerged condition, the centre of buoyancy needs to be positioned above the centre of gravity 24, and a stable transition between the surfaced and submerged conditions is achieved in accordance with the invention by controlling the position of the centre of buoyancy of the gravity base structure 10 relative to the position of the centre of gravity 24 so that the centre of buoyancy moves to a position above the centre of gravity 24 whilst the waterplane of the gravity base structure 10 is preserved. More particularly, in the illustrated embodiment it is the ability to vary the position of the third ballast tank 22 and its rigid control surface 23 that enables the position of the centre of buoyancy to be controlled, thereby enabling the stability of the gravity base structure 10 to be carefully controlled during the transition between the surfaced and submerged conditions, and vice-versa.

Figure 2:
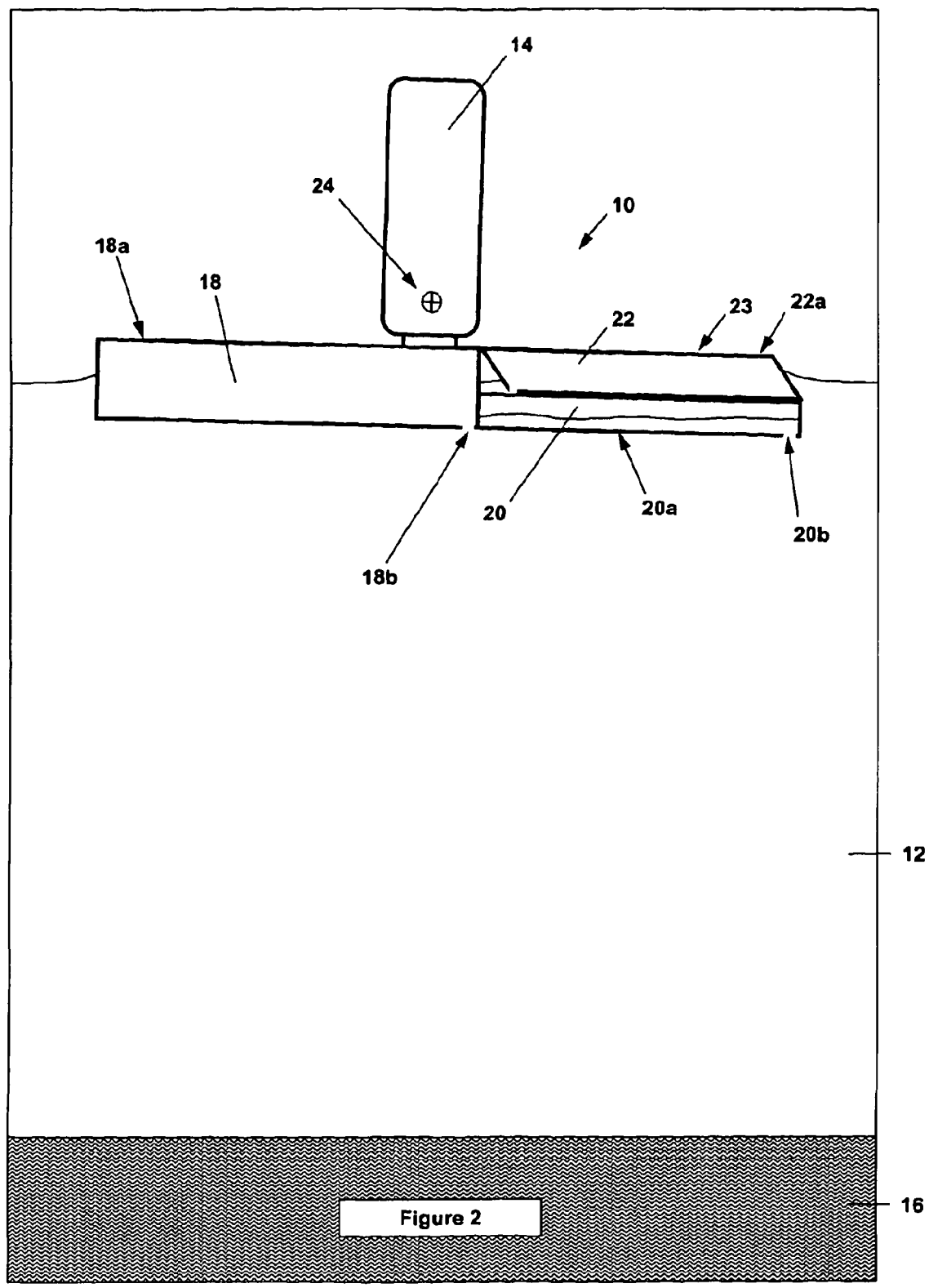
FIGS. 2 to 8 are schematic side elevations of the foundation structure of FIG. 1 at various positions during its deployment.
Figure 3:
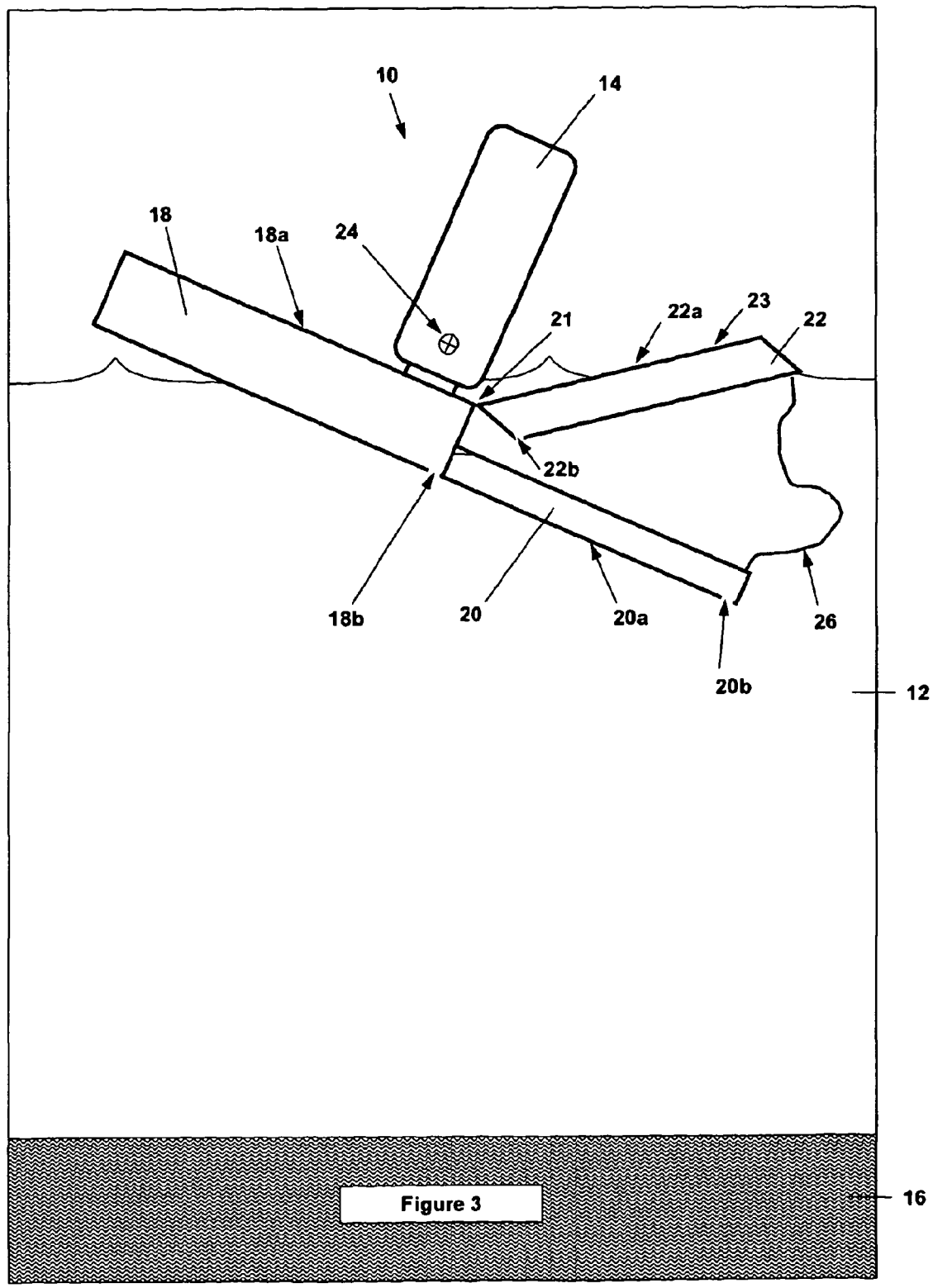

Referring to FIG. 2, water is initially introduced into the second ballast tank 20 via the limber hole 20b and this causes the stem of the gravity base structure 10 to become submerged in the water 12. As the volume of water in the second ballast tank 20 increases until it is completely filled with water, it sinks further into the water 12 as shown in FIG. 3 causing the stern of the gravity base structure 10 to become submerged deeper in the water 12 whilst the bow of the gravity base structure 10 rises out of the water 12. However, because the third ballast tank 22 is pivotally mounted relative to the gravity base structure 10, it does not sink in the water, as a result of its own positive buoyancy, and thus moves relative to the gravity base structure 10 as the gross buoyancy of the gravity base structure 10 changes. If retaining means are provided, it will be necessary to release the retaining means to enable this movement to take place. The gravity base structure 10 includes a restraint in the form of a tether 26 which, in the illustrated embodiment, extends between the second and third ballast tanks 20, 22 to limit the pivotal movement of the third ballast tank 22 relative to the gravity base structure 10, as is clearly shown in FIG. 4.

Figure 4:
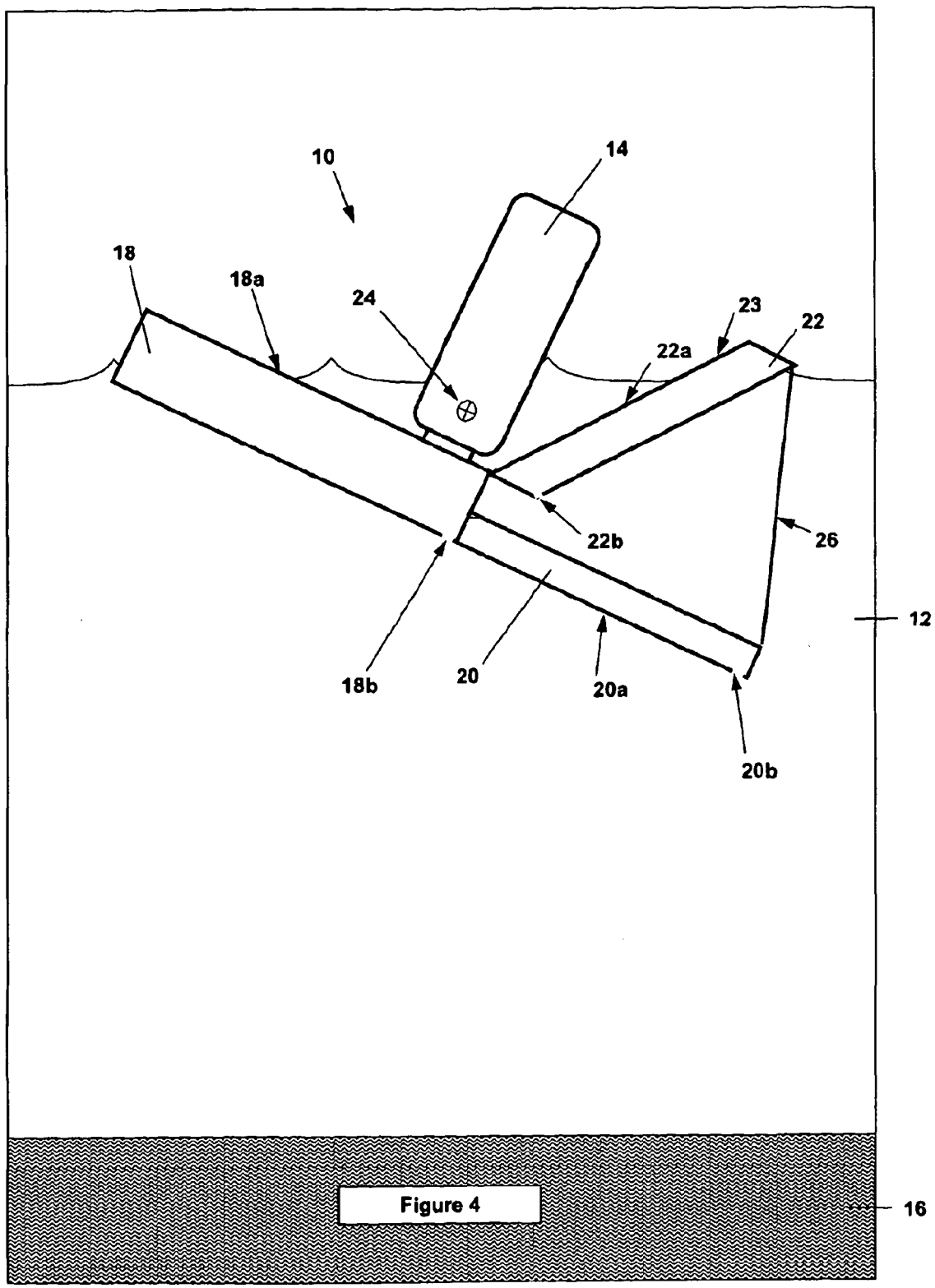

In the condition shown in FIG. 4, the gravity base structure 10 is partially submerged but is still positively buoyant and does not, therefore, sink further into the water 12. The centre of buoyancy of the gravity base structure 10 has, however, moved from its original position below the centre of gravity 24 to a position above the centre of gravity 24, as is required for submerged stability of the gravity base structure 10. Moreover, the rigid surfaces 18a, 22a of the first and third ballast tanks 18, 22 (including the rigid control surface 23 of the third ballast tank 22) retain a waterplane, and this stabilises the gravity base structure 10 in pitch and roll during the transition between the surfaced and submerged conditions.

Figure 5:
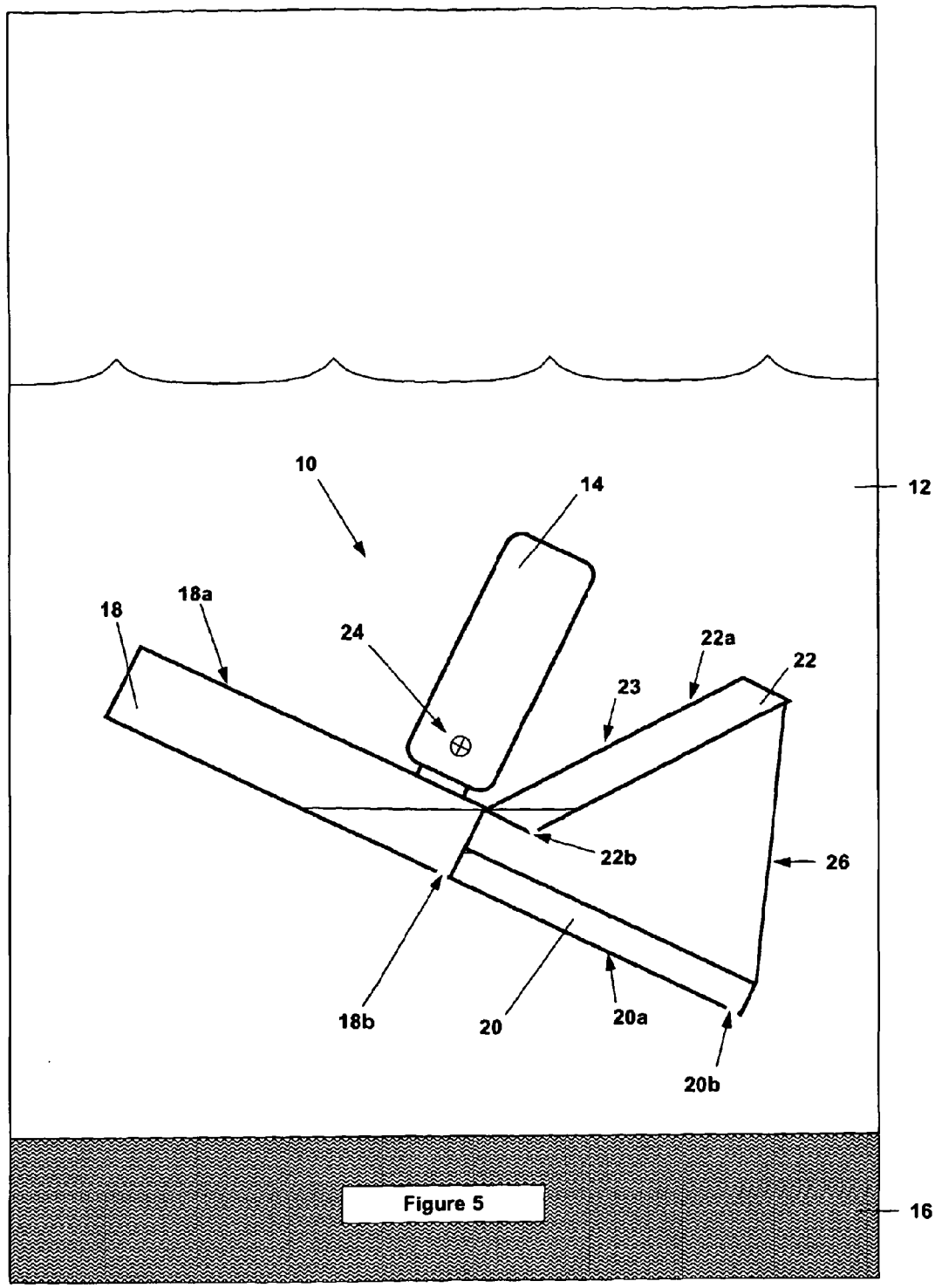
Figure 6:
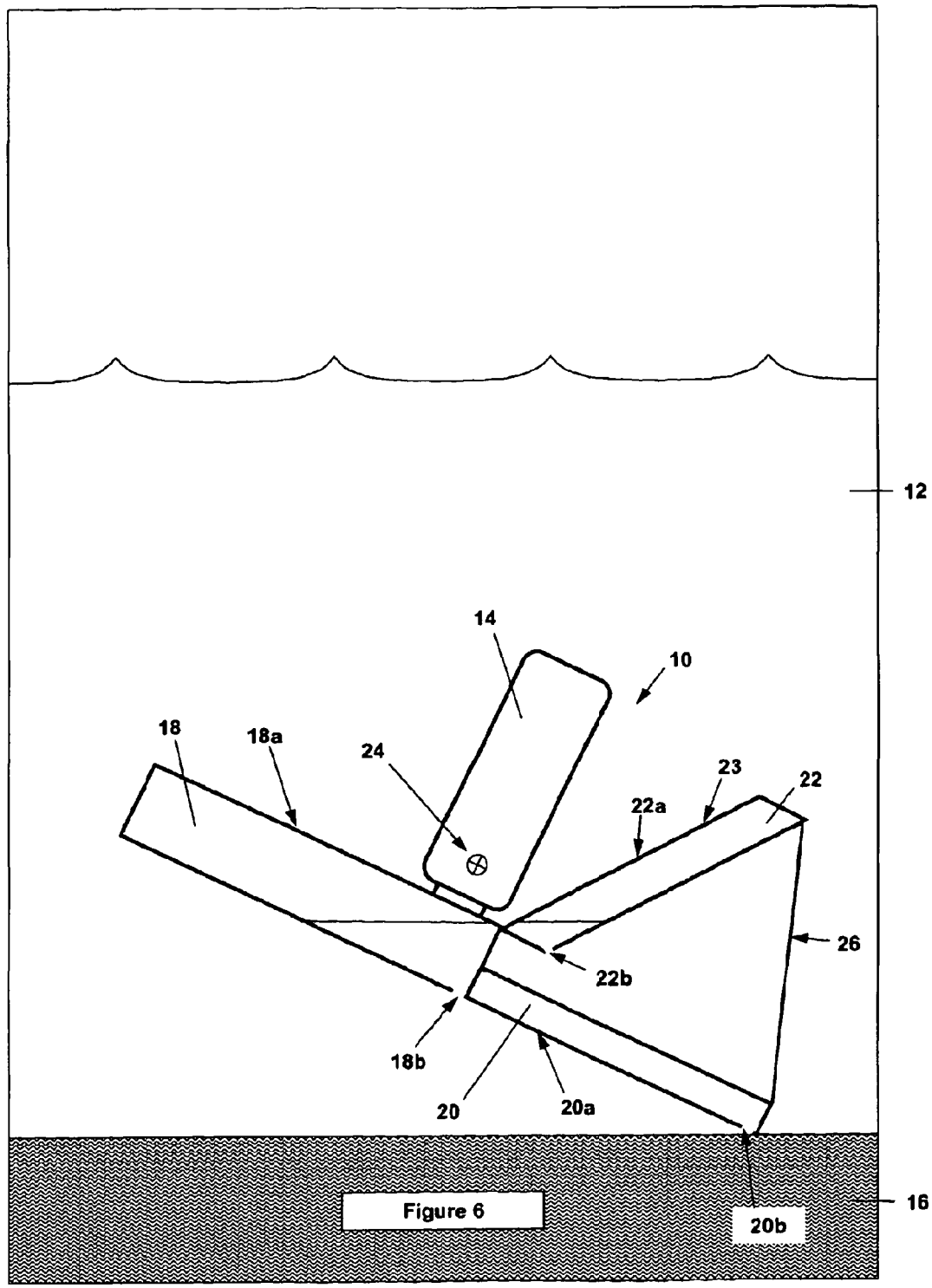

Referring to FIGS. 5 and 6, a suitable amount of water is introduced into the first and third ballast tanks 18, 22 via their respective limber holes 18b, 22b so that the gravity base structure 10 becomes negatively buoyant and sinks towards the sea bed or river bed 16. The gravity base structure 10 advantageously maintains the general orientation shown in FIGS. 4 to 6 due to the waterplane that is provided by the rigid surfaces 18a, 22a of the first and third ballast tanks 18, 22 just before it moves below the surface of the water 12 and due to the fact that the centre of buoyancy is positioned above the centre of gravity 24, as required for submerged stability.

Figure 7:
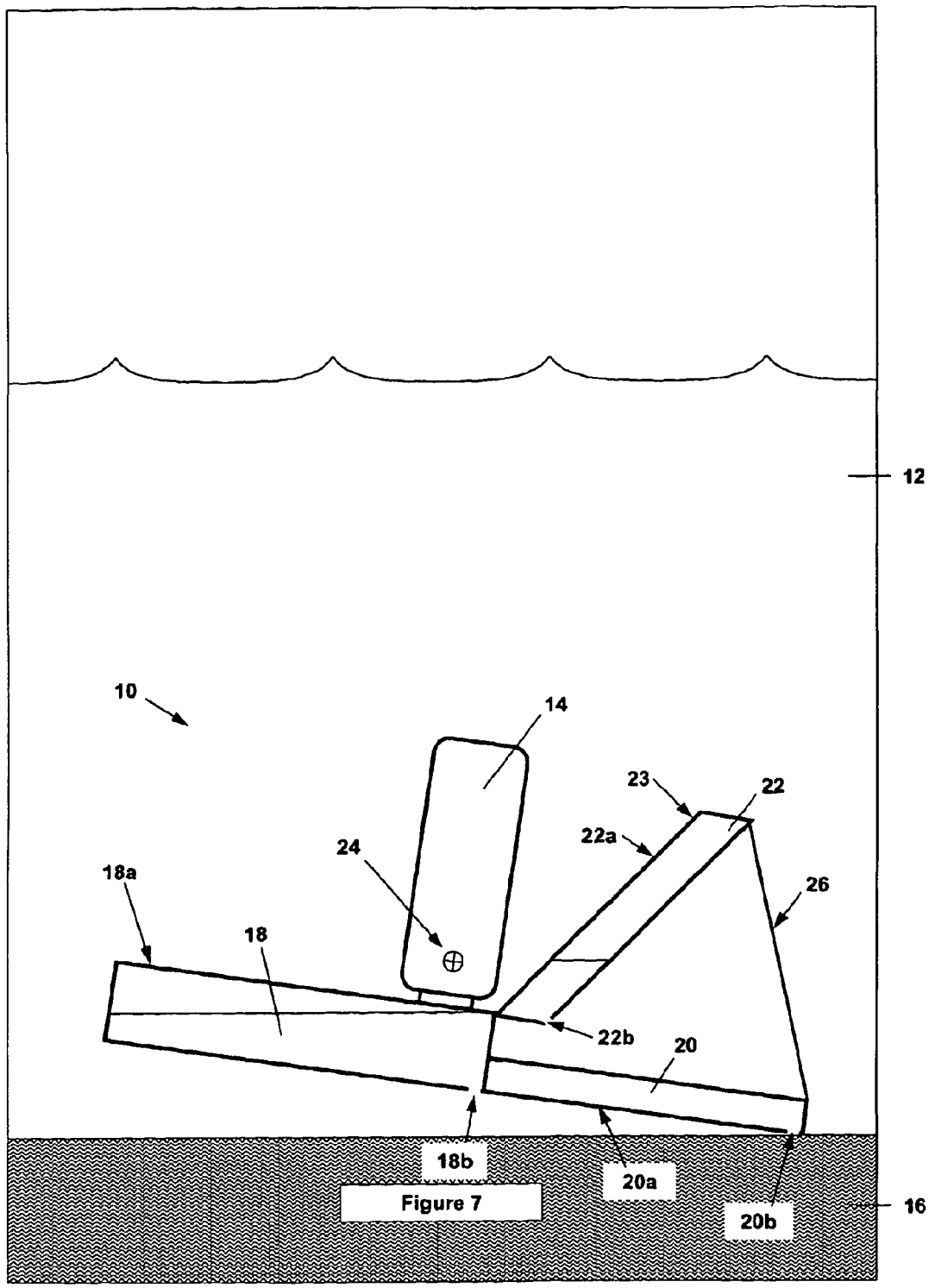
Figure 8:
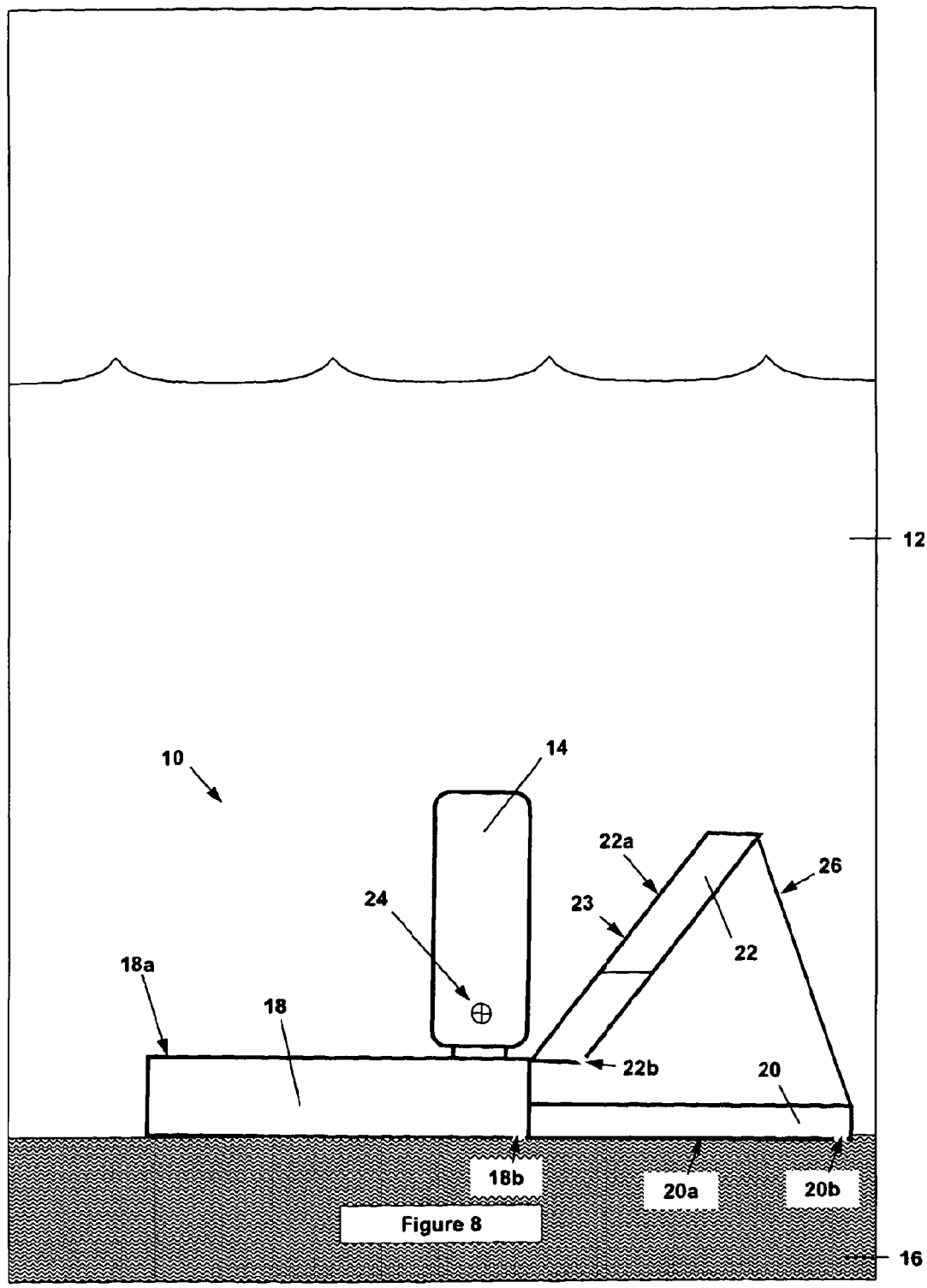
Figure 9:
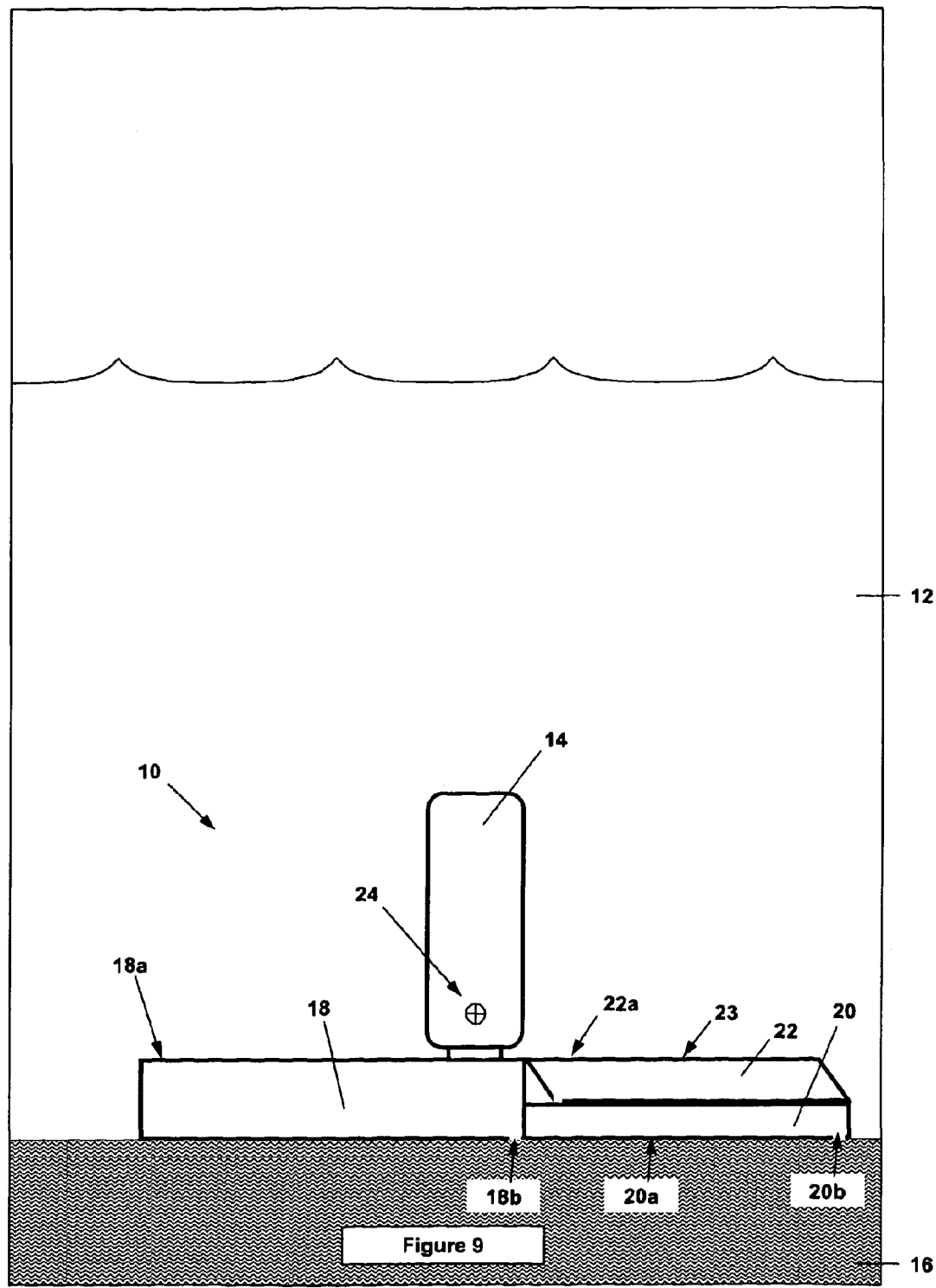
FIG. 9 is a schematic side elevation of the foundation structure located on a sea bed or river bed.

As shown in FIGS. 6 and 7, the stern of the gravity base structure 10, and specifically the second ballast tank 20, initially contacts the sea bed or river bed 16 and continued downward movement of the gravity base structure 10 causes a reduction in the trim angle due to the partial support that is provided by the sea bed or river bed 16. The controlled introduction of further water into the first and/or third ballast tanks 18, 22 causes the gravity base structure 10 to move to a position in which it rests substantially flat on the sea bed or river bed 16, as best seen in FIG. 8. In this condition, the third ballast tank 22 has not been completely filled with water and therefore remains in the extended position due to its own positive buoyancy. However, by introducing further water into the third buoyancy tank 22 to vary its buoyancy, the third buoyancy tank 22 becomes negatively buoyant and thus moves to its original retracted position in which it does not extend outwardly from the gravity base structure 10, thereby reducing drag forces on the gravity base structure 10. This fully deployed condition is shown in FIG. 9.

If the tidal turbine or other object 14 needs to be retrieved from the sea bed or river bed 16 for any reason, the gravity base structure 10 can be surfaced by increasing its gross buoyancy and in particular can be retrieved in a stable manner by reversing the sequence of steps described above.

It will be appreciated that the position of the centre of gravity 24 of the gravity base structure 10 will vary depending on the amount of water in each ballast tank 18, 20, 22, the trim angle of the complete gravity base structure 10 and the angular position of the third ballast tank 22 relative to the remainder of the gravity base structure 10. Despite this, the deployment and retrieval method for the gravity base structure 10 described above allows the gravity base structure 10 to retain a waterplane until the centre of buoyancy has been moved to a position above the centre of gravity 24 to preserve adequate stability of the gravity base structure 10 during the transition between surfaced and submerged conditions, and vice-versa.

Figure 11:
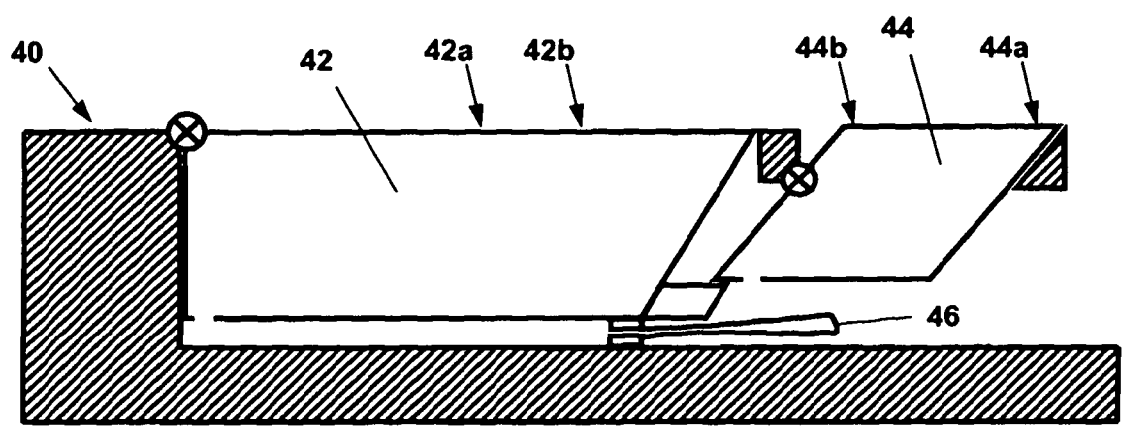
FIGS. 11 to 13 are schematic side elevations of part of a modified foundation structure according to another embodiment of the invention in various operational conditions.
Figure 12:
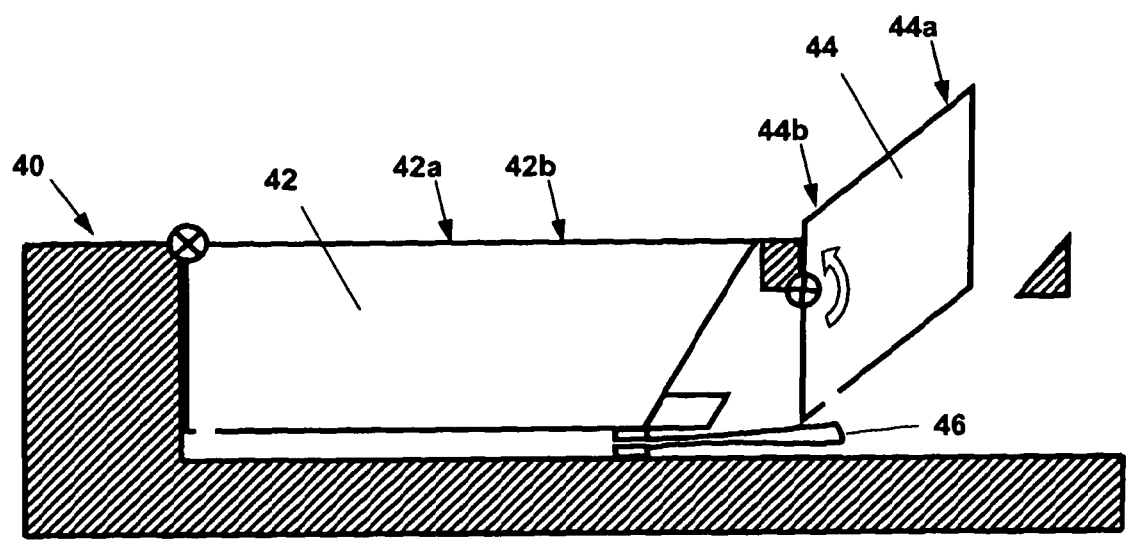
Figure 13:
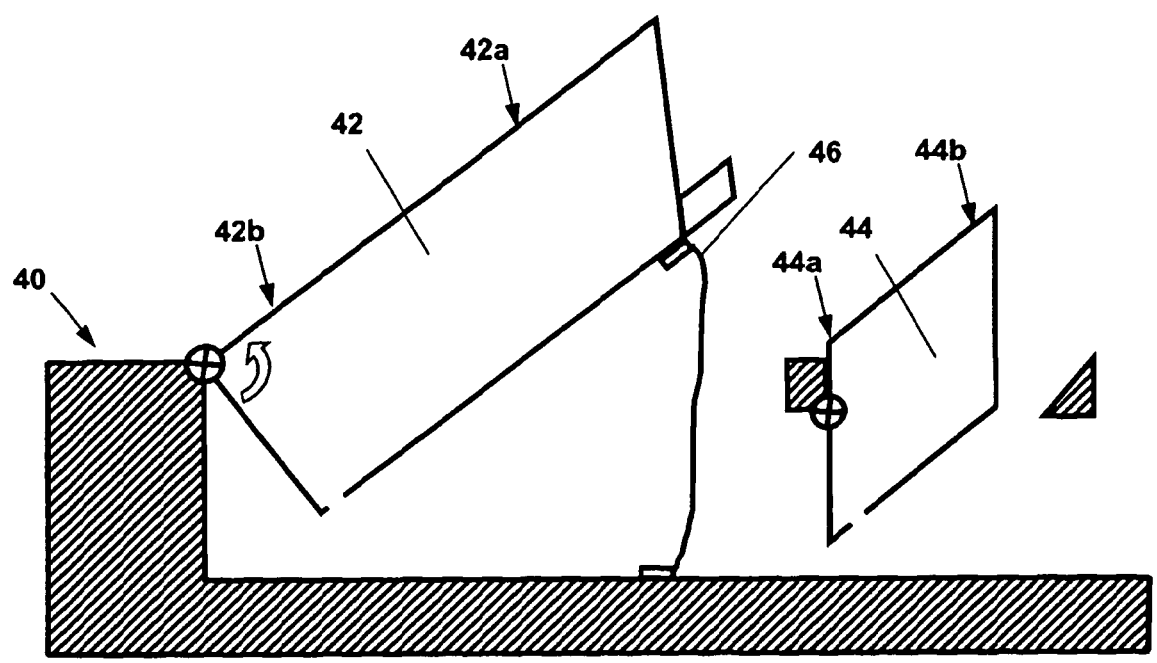

Referring now to FIGS. 11 to 13, there is shown part of a modified foundation structure 40 which could form part of the gravity base structure 10 shown in FIGS. 1 to 10 or an alternative foundation structure. The foundation structure 40 includes two movable integral buoyancy devices in the form of movable ballast tanks 42, 44. Each ballast tank 42, 44 includes a plurality of rigid surfaces 42a, 44a which define a fixed buoyant volume. The rigid surfaces 42a, 44a of one or both ballast tanks 42, 44 act as a rigid control surface 42b, 44b.

In the same way as has already been described above, by controlling the position of the movable ballast tanks 42, 44 and hence the rigid control surfaces 42b, 44b, the foundation structure 40 retains a waterplane until the centre of buoyancy has been moved from a position below the centre of gravity (so that the foundation structure 40 is metastable in the surfaced condition) to a position above the centre of gravity (so that the foundation structure 40 is stable in the submerged condition).

In this alternative embodiment, the movement of the second movable ballast tank 44 is used to control the movement of the first movable ballast tank 42. More particularly, when the second movable ballast tank 44 is in the retracted position shown in FIG. 11, it cooperates with the adjacent first movable ballast tank 42 and retains it in the retracted position. As the second movable ballast tank 44 pivots relative to the foundation structure 40 and moves towards the extended position as shown in FIG. 12, it no longer cooperates with the first movable ballast tank 42. The first movable ballast tank 42 is, thus, free to move from the retracted position towards the extended position shown in FIG. 13 by pivoting relative to the foundation structure 40. A restraint in the form of a tether 46 is again used to limit the maximum pivotal movement of the first movable ballast tank 42 relative to the foundation structure 40.

In embodiments in which the foundation structure 40 is part of the gravity base structure 10 described above with reference to FIGS. 1 to 10, the movable ballast tank 42 is equivalent to the third ballast tank 22 and is pivotally mounted on the first ballast tank 18, as aforesaid.

FIGS. 14 to 19 illustrate an alternative embodiment of a gravity base structure 50 at varying stages of deployment. The gravity base structure 50 is similar to the gravity base structure 10 illustrated in FIGS. 1 to 10.

The gravity base structure 50 includes an integral static ballast tank 52 which is similar to the first ballast tank 18 of the gravity base structure 10 and a pair of integral movable ballast tanks 54a, 54b. Although not illustrated, a plurality of static ballast tanks 52 could be provided. The integral movable ballast tanks 54a, 54b are similar to the movable third ballast tank 22 of the gravity base structure 10 but in this alternative embodiment include generally cylindrical tanks.

Figure 14:
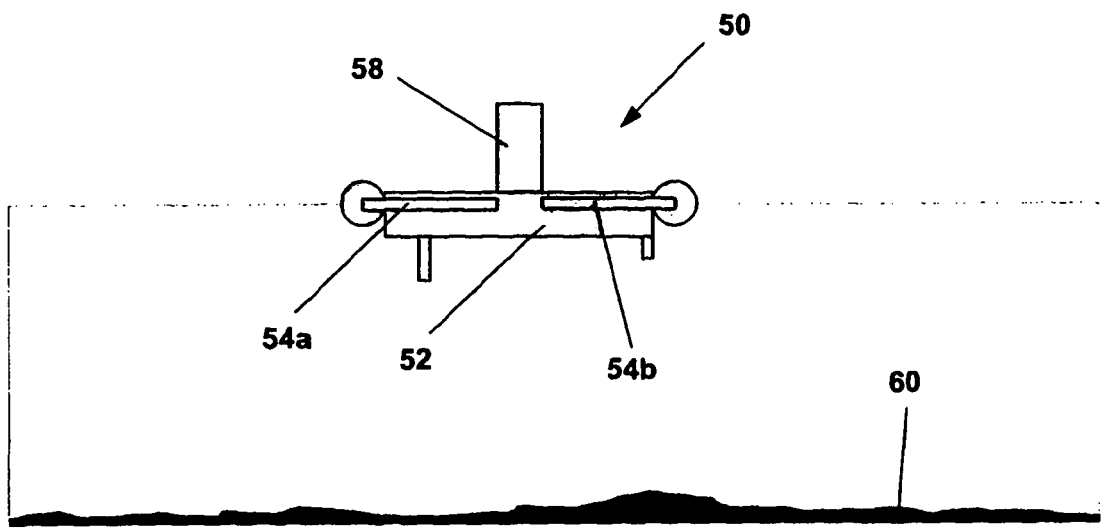
FIGS. 14 to 19 are schematic side elevations of a further embodiment of a foundation structure at various positions during its deployment.
Figure 16:
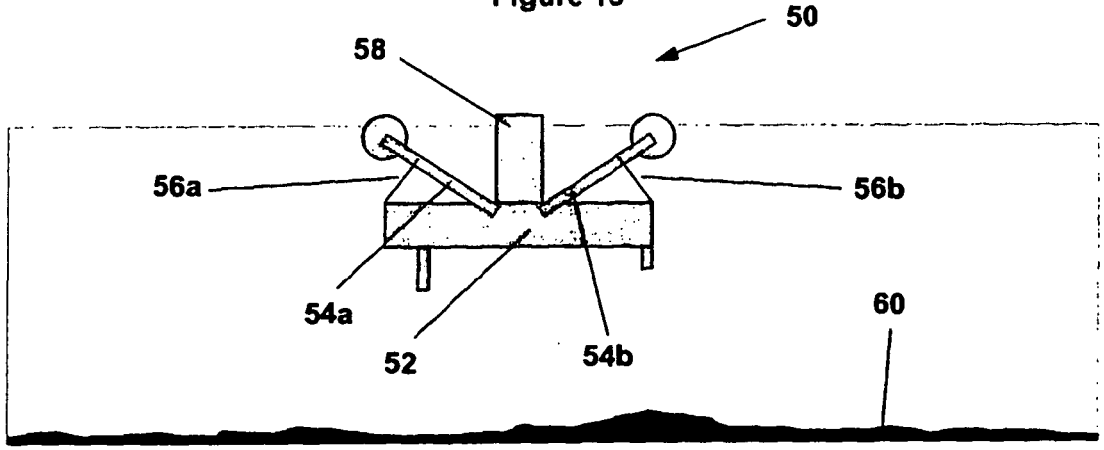

Each of the integral movable ballast tanks 54a, 54b is pivotally mounted on the static ballast tank 52 via a respective pivotal mounting for movement between a retracted position illustrated in FIG. 14 and a fully extended position illustrated in FIG. 16. The movable ballast tanks 54a, 54b are symmetrically mounted on the static ballast tank 52, and hence on the gravity base structure 50, generally about a centreline of the gravity base structure 50.

Figure 15:
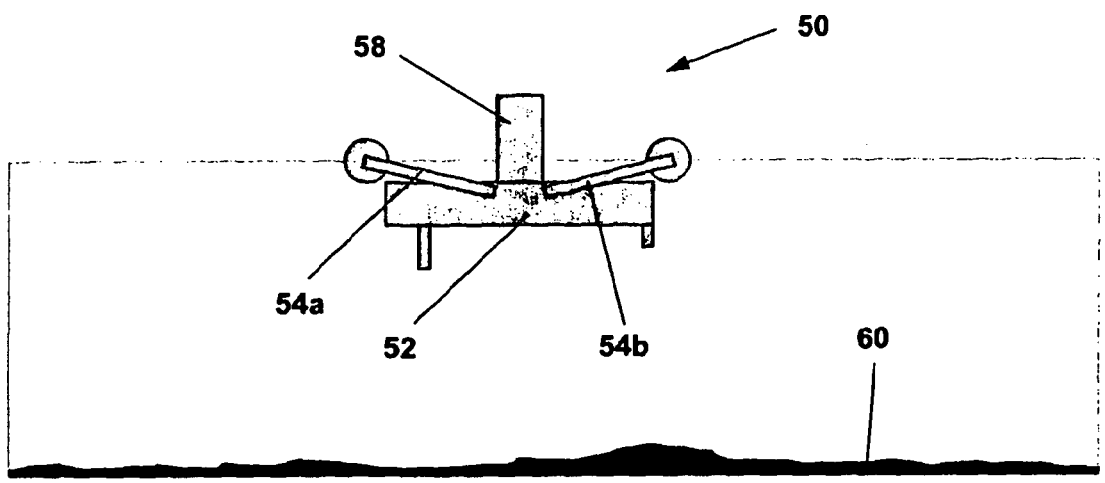

The gravity base structure 50 is submerged by initially flooding the static ballast tank 52. During the initial stages of submergence, the movable ballast tanks 54a, 54b contain only a suitable gas, such as air, and thus pivot upwardly, as shown in FIGS. 15 and 16, relative to the static ballast tank 52 as the gravity base structure 50 sinks into the water. Tethers 56a, 56b or other suitable restraints limit the pivotal movement of the movable ballast tanks 54a, 54b. Because the movable ballast tanks 54a, 54b are arranged symmetrically, the static ballast tank 52, and hence the object 58 mounted on the gravity base structure 50, maintains a generally horizontal attitude during submergence and surfacing of the gravity base structure 50.

Figure 17:
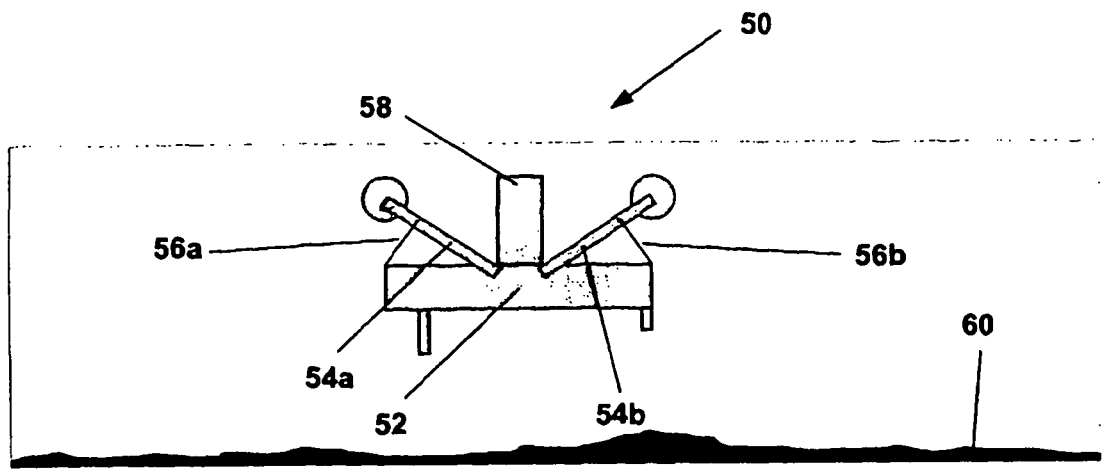

Water is introduced into the movable ballast tanks 54a, 54b, typically at the same flow rate to maintain the generally horizontal attitude of the gravity base structure 50. The gravity base structure 50 eventually becomes negatively buoyant and sinks towards the sea bed or river bed 60, as shown in FIG. 17. As explained above with reference to FIGS. 1 to 10, the stability of the gravity base structure 50 is maintained during the transition between the surfaced and submerged conditions, when the centre of buoyancy moves from a position below the centre of gravity to a position above the centre of gravity, due to the waterplanes that are provided by the rigid control surfaces of the movable ballast tanks 54a, 54b.

Figure 18:
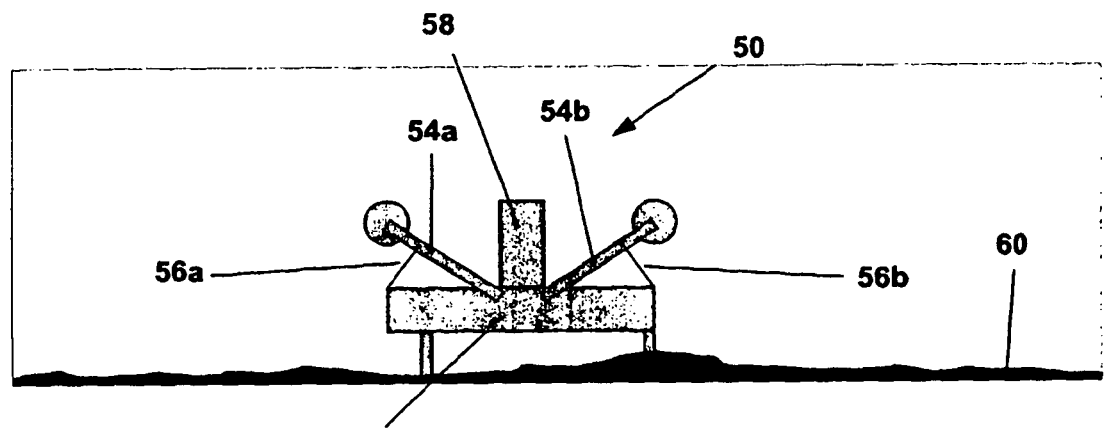
Figure 19:
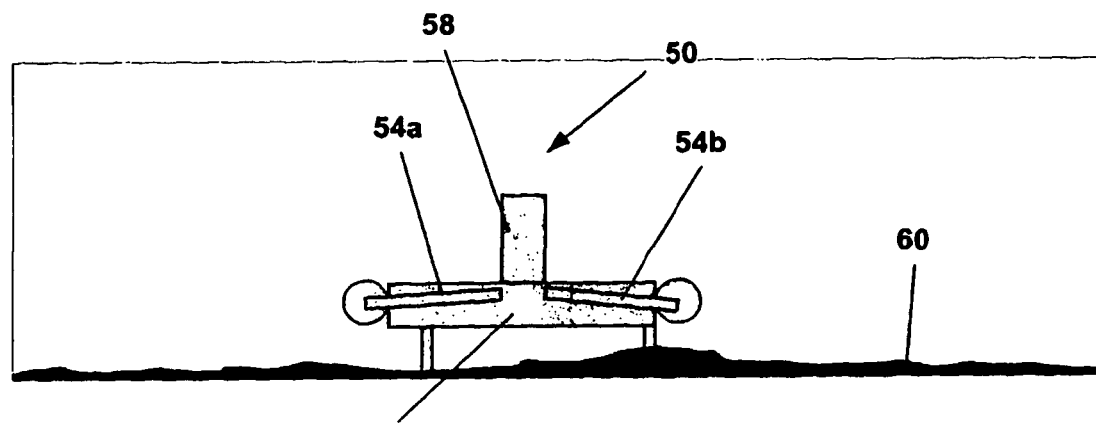

Once the gravity base structure 50 has reached the position shown in FIG. 18 in which it rests on the sea bed or river bed 60, the movable buoyancy tanks 54a, 54b can be completely flooded with water to vary their buoyancy and move them from the extended position to the retracted position shown in FIG. 19 such that the gravity base structure 50 is fully deployed.

Figure 20:
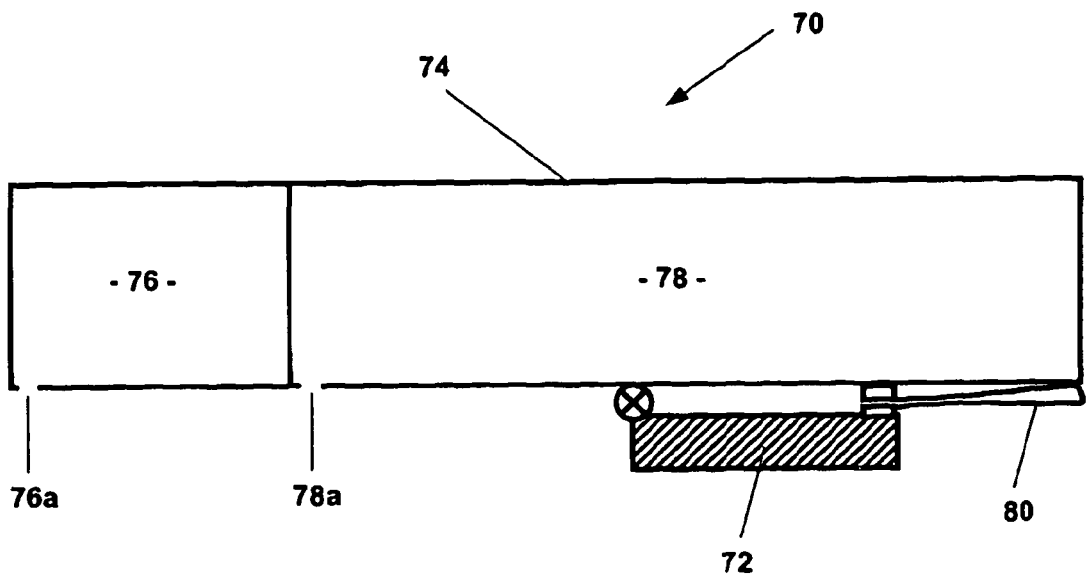
FIGS. 20 and 21 are schematic side elevations of part of another embodiment of a foundation structure in different operational conditions.
Figure 21:
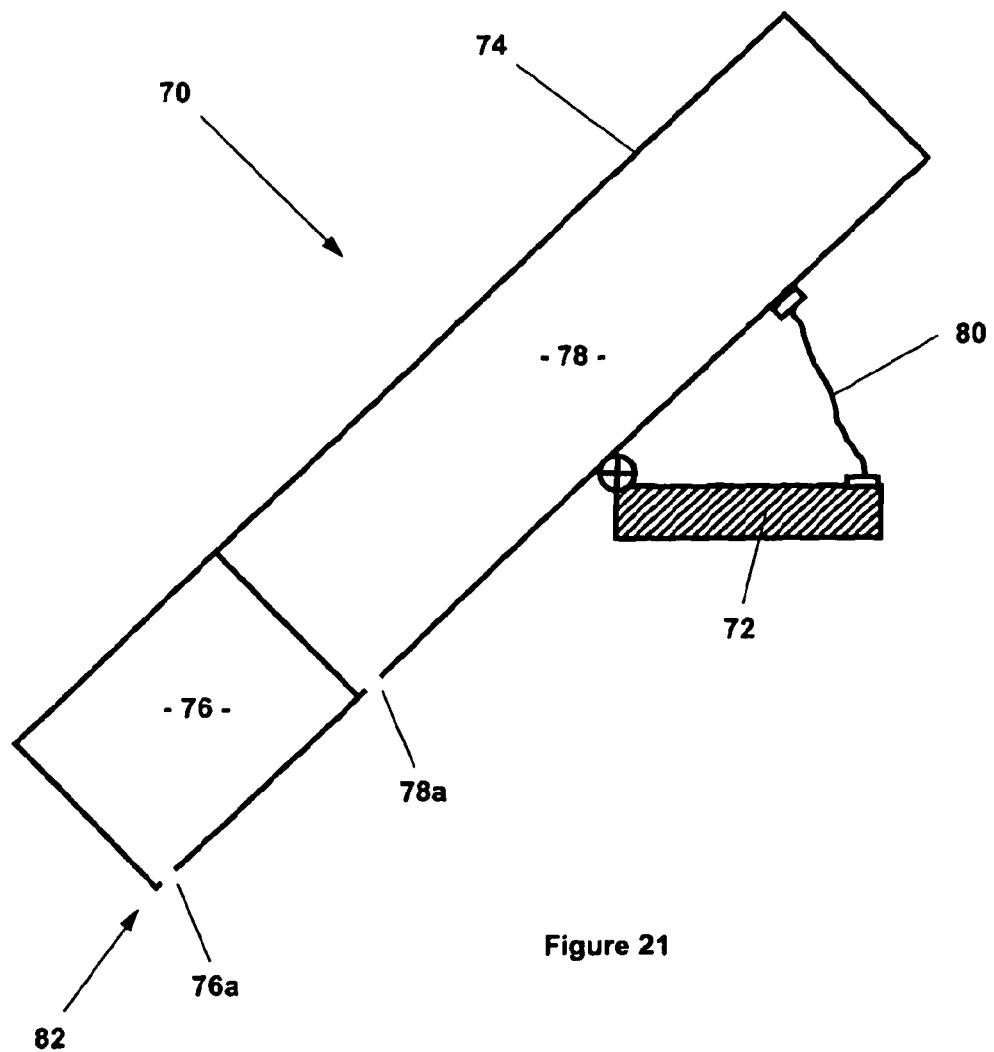

Referring to FIGS. 20 and 21, there is shown part of a further embodiment of a gravity base structure 70. The gravity base structure 70 includes a static part 72, which could be a space-frame assembly or similar support structure, and an integral movable buoyancy device 74 which is pivotally mounted on the static part 72. In practice, several integral movable buoyancy devices 74 are typically mounted on a common static part 72. This enables the attitude of the static part 72 to be controlled, and more particularly to be maintained generally horizontal, during submergence and surfacing operations as described above with reference to FIGS. 14 to 19.

In the illustrated embodiment, the integral movable buoyancy device 74 includes first and second buoyancy tanks 76, 78. Each buoyancy tank 76, 78 includes a respective limber hole 76a, 78a and a vent arrangement (not shown). These enable water/gas to be introduced into and/or removed from each buoyancy tank 76, 78 to thereby enable the buoyancy of each tank 76, 78 to be individually and independently varied. The integral movable buoyancy device 74 is configured such that it adopts the horizontal, retracted, position illustrated in FIG. 20 when the first and second ballast tanks 76, 78 are either completely devoid of water (and, hence, filled with a suitable gas) or when they are completely filled with water. In other non-illustrated embodiments, first and second groups of buoyancy tanks could be provided with the total buoyancy of the first and second groups being individually and independently variable.

The gravity base structure 70 is initially submerged by flooding the first ballast tank 76. This causes the integral movable buoyancy device 74 and its associated rigid control surfaces to move from the retracted position shown in FIG. 20 to an extended position shown in FIG. 21. A tether 80 or other suitable restraint limits the pivotal movement of the integral movable buoyancy device 74 relative to the static part 72 and defines the extended position.

In order to render the gravity base structure 70 negatively buoyant so that it moves from the surfaced condition to the stable submerged condition, further water may need to be introduced as necessary into the first and second ballast tanks 76, 78, without completely flooding the second ballast tank 78. The stability of the gravity base structure 70 is maintained during the transition between the surfaced and submerged conditions, when the centre of buoyancy moves from a position below the centre of gravity to a position above the centre of gravity, due to the waterplane that is provided by the integral movable buoyancy device 74 and more particularly its rigid control surfaces.

When the gravity base structure 70 approaches the sea bed or river bed (not shown in FIG. 20 or 21), the region 82 of the integral movable buoyancy device 74 may initially contact the sea bed or river bed. This contact tends to rotate the integral movable buoyancy device 74 in a clockwise direction about the pivotal mounting which movement is resisted by the residual buoyancy of the second buoyancy tank 78.

This tends to cushion the impact of the gravity base structure 70 as it contacts the sea bed or river bed.

In order to move the integral movable buoyancy device 74 from the extended position shown in FIG. 21 to the retracted position shown in FIG. 20, and thereby fully position the gravity base structure 70 on the sea bed or river bed, the second ballast tank 78 is finally completely flooded with water.

Although embodiments of the present invention have been described in the preceding paragraphs, it should be understood that various modifications may be made to those embodiments without departing from the scope of the present invention.

For example, the gravity base structure 10 can comprise any suitable number of ballast tanks. Integral buoyancy devices other than ballast tanks can be used, provided that the or each integral movable buoyancy device has a rigid control surface. The ballast tanks or other integral buoyancy devices can be arranged in any suitable configuration on the gravity base structure 10.

Although the illustrated foundation structure is a gravity base structure 10 that is held in place on the sea bed or river bed 16 solely by frictional forces, the foundation structure could be anchored to the sea bed or river bed 16 to hold it in place.

Many variations of the foundation structure 40 in which the movement of one movable ballast tank 42 is at least partially controlled by the movement of another movable ballast tank 44 are possible and are entirely within the scope of the present invention.

For the avoidance of doubt, it should be understood that the gravity base structure 10, 40, 50, 70 is equally as suitable for location on the bed of a lake as it is for location on a sea bed or river bed.

What is claimed is:

1. A foundation structure for locating an object mounted on the foundation structure on a sea bed or a river bed, the foundation structure comprising:
   a plurality of integral buoyancy devices, the plurality of integral buoyancy devices including first and second static ballast tanks, and a third movable ballast tank having a rigid control surface and pivotably mounted on the first static ballast tank and above the second static ballast tank, each of the plurality of integral buoyancy devices having variable buoyancy, the third movable integral ballast tank being movable relative to the first and second static ballast tanks to vary the position of the rigid control surface and control the position of a center of buoyancy relative to the position of a center of gravity, wherein the foundation structure is movable between
   a fully surfaced condition, wherein the foundation structure floats on a surface of a body of water, and wherein the center of buoyancy of the foundation structure is positioned below the center of gravity of the foundation structure, and
   a fully submerged condition, wherein the first and second static ballast tanks of the foundation structure are adjacent to one another and each of the first and second static ballast tanks are directly in contact with a bed of the body of water and wherein the center of buoyancy of the foundation structure is positioned above the center of gravity of the foundation structure.

2. A foundation structure according to claim 1, wherein each of the plurality of integral movable buoyancy devices comprises a plurality of rigid surfaces enclosing a buoyant volume.

3. A foundation structure according to claim 1, wherein the third movable ballast tank is movable between a retracted position and an extended position.

4. A foundation structure according to claim 3, wherein the third movable ballast tank is substantially aligned with adjacent surfaces of the first and second static ballast tanks when in the retracted position.

5. A foundation structure according to claim 4, wherein the third movable ballast tank extends outwardly away from the first and second static ballast tanks when in the extended position.

6. A foundation structure according to claim 1, wherein the movement of the third movable ballast tank relative to the first and second static ballast tanks is controlled by varying the gross buoyancy of the foundation structure.

7. A foundation structure according to claim 1, wherein the movement of the third movable ballast tank relative to the first and second static ballast tanks is controlled by varying the buoyancy of one or more of the first and second static ballast tanks.

8. A foundation structure according to claim 1, wherein the buoyancy of the third movable ballast tank is individually controllable to vary its position relative to the first and second static ballast tanks.

9. A foundation structure according to claim 1, wherein the foundation structure includes one or more restraints to limit the movement of the third movable ballast tank relative to the first and second static ballast tanks.

10. A foundation structure according to claim 1, wherein the foundation structure includes one or more actuators to control the movement of the third movable ballast tank relative to the first and second static ballast tanks.

11. A method for controlling the deployment and retrieval of a foundation structure having an object mounted thereon for location on a sea bed or river bed, the foundation structure comprising a plurality of integral buoyancy devices, the plurality of integral buoyancy devices including first and second static ballast tanks, and a third movable ballast tank having a rigid control surface and pivotably mounted on the first static ballast tank and above the second static ballast tank, each of the plurality of integral buoyancy devices having variable buoyancy, the method comprising:

varying the position of the third movable ballast tank relative to the first and second static ballast tanks to vary the position of the rigid control surface and control the position of a center of buoyancy relative to the position of a center of gravity, the center of buoyancy of the foundation structure being positioned below the center of gravity of the foundation structure when the foundation structure is in a fully surfaced condition wherein the foundation structure floats on a surface of a body of water, and the center of buoyancy of the foundation structure being positioned above the center of gravity of the foundation structure when the foundation structure is in a fully submerged condition, and wherein the first and second static ballast tanks of the foundation structure are adjacent to one another and each of the first and second static ballast tanks are directly in contact with the sea bed or river bed.

12. A method according to claim 11, comprising:
varying the gross buoyancy of the foundation structure to vary the position of the third movable ballast tank relative to the first and second static ballast tanks.

13. A method according to claim 11, comprising:
varying the buoyancy of the third movable ballast tank to vary its position relative to the first and second static ballast tanks.

14. A method according to claim 11, comprising:
varying the buoyancy of one or more of the first and second static ballast tanks to vary the position of the third movable ballast tank relative to the first and second static ballast tanks.

15. A method according to claim 11, comprising:
varying the position of the third movable ballast tank relative to the first and second static ballast tanks to vary the position of the rigid control surface.

16. A method according to claim 11, comprising:
moving the third movable ballast tank to an extended position during submergence and surfacing of the foundation structure.

17. A method according to claim 16, wherein the extended position of the third movable ballast tank is defined by limiting the movement of the third movable ballast tank.

18. A method according to claim 11, comprising:
moving the third movable ballast tank to a retracted position when the foundation structure is located on the sea bed or river bed.

19. A method according to claim 11, wherein the third movable ballast tank comprises a buoyancy tank and the method comprises varying the buoyancy of the buoyancy tank by varying the quantity of fluid inside the buoyancy tank.

20. A foundation structure according to claim 1, wherein a combined depth of the second static ballast tank and the third movable ballast tank is about equal to a depth of the first static ballast tank.

21. A foundation structure according to claim 1, wherein the first static ballast tank is located at a stern of the foundation structure and the second static ballast tank and the third movable ballast tank are located at a bow of the foundation structure.

22. A foundation structure according to claim 1, comprising:
a tidal turbine mounted on the foundation structure.

23. A foundation structure according to claim 1, comprising:
a pair of the plurality of integral buoyancy devices, which are arranged side by side.

24. A method according to claim 11, wherein a combined depth of the second static ballast tank and the third movable ballast tank is about equal to a depth of the first static ballast tank.

25. A method according to claim 11, comprising:
locating the first static ballast tank at a stern of the foundation structure and the second static ballast tank and the third movable ballast tank at a bow of the foundation structure.

26. A method according to claim 11, comprising:
mounting a tidal turbine on the foundation structure.

27. A method according to claim 11, comprising:
arranging a pair of the plurality of integral buoyancy devices side by side.

28. A foundation structure according to claim 3, wherein the third movable ballast tank extends outwardly away from the first and second static ballast tanks when in the extended position.

29. A foundation structure according to claim 4, wherein the third movable ballast tank becomes negatively buoyant in the fully submerged condition and moves to the retracted position.

30. A method according to claim 18, comprising:
introducing water into the third movable ballast tank so that the third ballast tank becomes negatively buoyant; and
moving the third movable ballast tank in the fully submerged condition to the retracted position.

31. A method according to claim 30, comprising:
substantially aligning the third movable ballast tank with adjacent surfaces of the first and second static ballast tanks when in the retracted position in the fully submerged condition.

* * * * *